(12) United States Patent
Suzuki

(10) Patent No.: US 6,665,034 B2
(45) Date of Patent: Dec. 16, 2003

(54) DISPLAY PANEL DEVICE, DISPLAY PANEL UNIT AND DISPLAY DEVICE

(75) Inventor: Shunji Suzuki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 10/037,371

(22) Filed: Jan. 3, 2002

(65) Prior Publication Data

US 2002/0089621 A1 Jul. 11, 2002

(30) Foreign Application Priority Data

Jan. 5, 2001 (JP) ......................................... 2001-000814

(51) Int. Cl.⁷ ..................... G02F 1/1337; G02F 1/133; G02F 1/1335
(52) U.S. Cl. .......................... 349/129; 349/73; 349/96; 349/123
(58) Field of Search ........................... 349/73, 74, 96, 349/123, 129

(56) References Cited

U.S. PATENT DOCUMENTS

| | | | |
|---|---|---|---|
| 4,989,954 A | * 2/1991 | Yokoyama et al. | 349/72 |
| 5,579,139 A | * 11/1996 | Abileah et al. | 349/117 |
| 6,335,773 B1 | * 1/2002 | Kamei et al. | 349/96 |
| 6,348,957 B1 | * 2/2002 | Yamazaki et al. | 349/15 |
| 6,577,360 B1 | * 6/2003 | Akiyama et al. | 349/96 |

FOREIGN PATENT DOCUMENTS

| | | |
|---|---|---|
| JP | 60-156048 | 8/1985 |
| JP | 07-140461 | 6/1995 |

* cited by examiner

Primary Examiner—Tarifur R. Chowdhury
(74) Attorney, Agent, or Firm—Ira D. Blecker

(57) ABSTRACT

A rubbing direction (X) for each upper substrate of a tile panel constituting a liquid crystal panel unit is set along a horizontal direction (H) of the liquid crystal panel unit, a rubbing direction (Y) for each lower substrate of the tile panel is set along a vertical direction (V) thereof, and absorption axes (S) of polarizing plates and are allowed to coincide with the horizontal direction (H) of the liquid crystal panel unit. Moreover, in a set of four tile panels, the rubbing directions (X) and (Y) are made to differ from one another, thus viewing directions (Z) of high contrast are distributed into four directions, and turning directions (reference codes (R) and (L)) of liquid crystal molecules in the respective tile panels are arranged alternately in the horizontal direction (H) of the liquid crystal panel unit.

16 Claims, 9 Drawing Sheets

PRIOR ART

PRIOR ART

DISPLAY PANEL DEVICE, DISPLAY PANEL UNIT AND DISPLAY DEVICE

BACKGROUND OF THE INVENTION

The present invention relates to a display panel device, a display panel unit and a display device for use in a liquid crystal display device and the like.

As a display device for a personal computer or other various monitors, a liquid crystal display device has been remarkably widespread. Such a liquid crystal display device is generally constituted in such a manner that a backlight as a planar light source is disposed on a back of a display panel to irradiate a liquid crystal surface of a specified expanse with an even bright light as a whole, and that an image formed on the liquid crystal surface of the display panel can be thereby visualized.

In the case of achieving enlargement of the liquid crystal display device as described above, under the present situation, since enlargement of the display panel itself has limitations, as shown in FIG. 6, a plurality of display panels 2 are arranged, and the display panels 2 and 2 adjacent to each other are adhered together, thus constituting a large-sized liquid crystal display device. In such a case, each of the display panels 2 is referred to as a tile panel.

Heretofore, in the display panel 2, data lines and scan lines for driving liquid crystal have been provided in a matrix fashion, and on two sides of the display panel 2, drive circuit portions 3 and 4 for the data lines and the scan lines are provided, respectively. For this reason, up to now, enlargement of a liquid crystal display device has been previously limited to a formation of four display panels 2 at the maximum, i.e., 2 vertical panels by @2 horizontal panels.

On the contrary, integration of the drive circuit portions 3 and 4 for the data lines and the scan lines in a matrix fashion has been developed as an integrated drive circuit portion, which is provided only on one side of the display panel 2. Thus, a liquid crystal display device extending long in one direction has become formable by connecting many pieces of the display panels 2 in either the vertical or the horizontal direction.

However, when the liquid crystal display device is enlarged as described above, first, there is a problem of a viewing angle characteristic. Specifically, in the case of enlarging the liquid crystal display device, for example, when the viewing angle characteristic of each display panel 2 is set with a center portion of a display area taken as a reference, there occurs such a problem as that it is difficult to see display contents in the periphery of the display area.

For the problem, various proposals have been made in order to improve the viewing angle characteristic on the entire display area of the large-sized liquid crystal display device. Basically, the viewing angle of the display panel 2 depends on a direction of rubbing performed on a substrate constituting the display panel 2, which regulates an aligning direction of the liquid crystal in the display panel 2. For example, in the gazettes of Japanese Patent Laid-Open Nos. Sho 60 (1985)-156048 and Hei 7 (1995)-140461, a liquid display device in which rubbing of a substrate is performed in different directions depending on a position of the display panel 2 in the display area thereof has already been proposed.

As a mode offering a more excellent viewing angle characteristic as compared with a twisted nematic (hereinafter abbreviated as TN) mode typically used in the display panel 2, an in-plane switching (IPS) mode and a vertical alignment (VA) mode are mentioned. Moreover, there is another type of the display panel 2, which is capable of improving the viewing angle characteristic even though a TN mode is used therein. As shown in FIG. 7, the display panel 2 of this type includes: a light collection member 6 for collecting a planar light irradiated from a backlight 5 thereon; and a diffusion member 7 for diffusing the light collected by the light collection member 6 and transmitted through the display panel 2, wherein the collection member 6 is disposed below the display panel 2, and the diffusion member 7 is disposed above the display panel 2. Improvement of the viewing angle characteristic is conceivable by adopting these constitutions into a large-sized liquid crystal display device.

However, in any of the cases as described above, when the liquid crystal display device is enlarged, there is another problem that a size thereof is limited by polarizing plates disposed above and below the display panel 2. As shown in FIGS. 7 and 8, a polarizing plate 8A for controlling light incident onto the display panel 2 is provided above the display panel 2, and a polarizing plate 8B for controlling light emitted from the display panel 2 is provided below the display panel 2. As shown in FIG. 8, for example, in the case of an o (ordinary)-mode, the polarizing plates 8A and 8B have optical absorption axes in directions shown by arrows (a), respectively. These polarizing plates 8A and 8B are severally provided with the direction of the absorption axis thereof based on the rubbing direction of the display panel 2 as a standard. When the liquid crystal display device is of a normally white mode, a state as shown in FIG. 8 is set, where the absorption axis of the polarizing plate 8A is allowed to coincide with a rubbing direction (b) of an upper substrate 2a, and the absorption axis of the polarizing plate 8B is allowed to coincide with a rubbing direction (c) of a lower substrate 2b. When the liquid crystal display device is of a normally black mode, both of the absorption axes of the polarizing plates 8A and 8B are allowed to coincide with the rubbing direction of the upper substrate 2a.

The directions of the absorption axes of the polarizing plates 8A and 8B, as shown in FIG. 9, depend on an extending direction (d) of a film-like material during fabrication thereof. In order to set the absorption axes of the polarizing plates 8A and 8B in directions approximately diagonal thereto, the polarizing plates 8A and 8B must be laid out aslant on a material 9 when the polarizing plates 8A and 8B are cut out of the material 9 extended in the direction shown by an arrow (d). Such a layout is applicable not only in the case of the o-mode, shown in FIG. 8, but also in the case of e (extraordinary)-mode.

Therefore, each size of the polarizing plates 8A and 8B, which can be cut out, has been forced to be significantly smaller with respect to a width W of the material 9, resulting in limitations of a size of the liquid crystal display device, particularly, a vertical size thereof. Moreover, since the polarizing plates 8A and 8B are laid out aslant to the material 9 and cut out, a yield of the material 9 is lowered, thus hindering the reduction of material costs.

In addition to the above-described problems, in the constitution using the light collection member 6 and the diffusion member 7 as shown in FIG. 7, the enlargement of the light collection member 6 and the diffusion member 7 has limitations, and further, transmission of light through the light collection member 6 and the diffusion member 7 causes an optical loss.

SUMMARY OF THE INVENTION

The present invention was made with the foregoing technical problems in mind. A principal object of the present invention is to provide a display panel device, a display panel unit and a display device, which are capable of achieving enlargement thereof and of reducing material costs of the polarizing plates. Another object of the present invention is to provide a display panel device, a display panel unit and a display device, which are capable of improving a viewing angle characteristic even in the case of enlargement thereof.

In order to achieve the foregoing objects, a display panel device of the present invention is characterized in that directions of aligning treatment for two substrates of a display panel are allowed to coincide with a vertical direction and a horizontal direction of the display panel device independently of each other, and directions of optical absorption axes of two polarizing plates are allowed to coincide with the vertical direction and the horizontal direction of the display panel device independently of each other. For example, it is satisfactory that the direction of the aligning treatment for one substrate out of the two substrates is allowed to coincide with the vertical direction of the display panel device, and that the direction of the aligning treatment for the other substrate is allowed to coincide with the horizontal direction thereof. Moreover, optical absorption axes of polarizing plates on both surfaces of the display panel device are allowed to coincide with either the vertical direction or the horizontal direction of the display panel device. In the case when the display panel device is of a normally black mode of a 90 degrees TN type, the both polarizing plates are allowed to coincide with any one of the vertical and horizontal directions of the display panel device, and when the display panel device is of a normally white mode of a 90 degrees TN type, one of the polarizing plates is allowed to coincide with the vertical direction of the display panel device, and the other polarizing plate is allowed to coincide with the horizontal direction thereof.

With such a constitution, the polarizing plates do not have to be obliquely cut out of a material extended in one direction. In this case, larger polarizing plates can be formed out of a material with the equal width, and a waste of the material is reduced. Moreover, when the directions of the optical absorption axes of the polarizing plates are allowed to coincide with a direction of a long axis of the display panel device, a display panel device longer in the long axis direction can be obtained. This is particularly effective in the case where the optical absorption axes of the both polarizing plates are allowed to coincide with the long axis direction of the display panel device, that is, in the display panel device of a normally black mode.

Here, the display panel may be only one, but also a plurality of display panels may be also arranged on one plane. In this case, one polarizing plate is disposed on each of both surfaces of the display panel device so as to cover the whole plurality of display panels. Moreover, when the plurality of display panels are provided, if the directions of aligning treatment for the adjacent display panels are made to differ from each other, viewing angle characteristics can be dispersed on the display panel device as a whole.

Meanwhile, as for combinations of the directions of the aligning treatment for the two substrates constituting the display panel and the optical absorption axes of the polarizing plates disposed on the both surfaces of the display panel, there are eight combinations as below. The display panel device of the present invention can be applied to any of these combinations. Here, when the combinations are represented in an order as: the direction of the optical absorption axis of the polarizing plate on an emitting surface side/the direction of aligning treatment for the substrate on the emitting surface side/direction of aligning treatment for the substrate on an incident surface side/the direction of the optical absorption axis of the polarizing plate on the incident surface side, then the eight combinations are represented as below.

(1) horizontal/vertical/horizontal/horizontal: normally black mode of 90 degrees TN type (o-mode)

(2) vertical/vertical/horizontal/horizontal: normally white mode of 90 degrees TN type (o-mode)

(3) horizontal/horizontal/vertical/horizontal: normally black mode of 90 degrees TN type (e-mode)

(4) vertical/horizontal/vertical/horizontal: normally white mode of 90 degrees TN type (e-mode)

(5) horizontal/horizontal/horizontal/horizontal: normally white mode of parallel alignment type (o-mode)

(6) vertical/horizontal/horizontal/horizontal: normally black mode of parallel alignment type (o-mode)

(7) vertical/vertical/vertical/horizontal: normally white mode of parallel alignment type (e-mode)

(8) horizontal/vertical/vertical/horizontal: normally black mode of parallel alignment type (e-mode).

Among the above combinations, the most preferable in those of the 90 degrees TN type is (1), and the most preferable in those of the parallel alignment type is (5).

When the present invention is conceived as a display panel unit comprising a plurality of modular display panels arranged on one plane, the display panel unit can be characterized in that the plurality of modular display panels are laid out in order that viewing directions showing high contrast of the modular display panels may be directed to a plurality of directions on the whole of the display panel unit, and in order that directions of aligning treatment may be parallel to either a long axis or a short axis of the display panel unit. The display panel unit described above may be provided with the polarizing plates on the both surfaces thereof.

As described above, the viewing directions showing high contrast in each modular display panel are varied, thus viewing angle characteristics on the whole display panel unit can be distributed. In this case, for each set of four pieces of the modular display panels, the viewing directions showing high contrast may be directed to four directions different from one another. Moreover, the modular display panels may be arranged along a direction of the long axis of the display panel unit in order that twisting directions of liquid crystal molecule alignments in the modular display panels may be alternated. In this case as well, the viewing angle characteristics can be distributed.

Furthermore, the present invention can be conceived as a display panel device comprising: a display panel unit; and polarizing plates having optical absorption axes allowed to coincide with directions of either a long axis or a short axis of the display panel unit, characterized in that a plurality of modular display panels constituting the display panel unit are subjected to aligning treatment in the directions of the optical absorption axes of the polarizing plates as standards. Here, as for the modular display panels, those of a so-called IPS mode can be used, which includes: pixel electrodes for applying a drive voltage to the liquid crystal; and common electrodes for generating electric field between the pixel electrodes and the common electrodes in a direction along the surface of the substrate.

A display panel device of the present invention can be characterized in that a plurality of modular display panels arranged on one plane are laid out in such a way that a viewing direction of high contrast in each of the modular display panels may be directed to a direction different from one another for each set of n pieces (n being equal or more than 2) of the modular display panels adjacent to one another. Here, if n equals to 4, the viewing directions of high contrast are set in four directions different from one another for each set of four pieces of the modular display panels. With such a constitution, it is made possible to achieve equalization of the viewing directions of high contrast when the whole of the display panel device is viewed. It is a matter of course that n is not limited to 4, but may be an integer of 2 or more. It is satisfactory that n is properly set in response to a size of the display panel device, desired viewing angle characteristics and the like.

The present invention can be also conceived as a display device, comprising: a display panel including a plurality of modular display panels arranged on one plane and polarizing plates respectively disposed along both surfaces of the modular display panels; a drive circuit for each of the modular display panels; and a light source for irradiating planar light onto the display panel, wherein, in each of the modular display panels, a direction of aligning treatment and directions of optical absorption axes of the polarizing plates thereof are severally coincident with any one of, or both of, the long and short axes of the display panel. In this case, in a pair of the modular display panels adjacent in the directions of the long axis and the short axis of the display panel, it is preferable that a combination of a direction of aligning treatment on one substrate and a direction of aligning treatment on the other substrate in one modular display panel and the combination of the same in the other modular display panel are made different from each other. Thus, the viewing directions of high contrast are made different from each other in a pair of modular display panels adjacent to each other.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

Hereinbelow, description will be made for the present invention based on an embodiment shown in the accompanying drawings.

Figure 1:
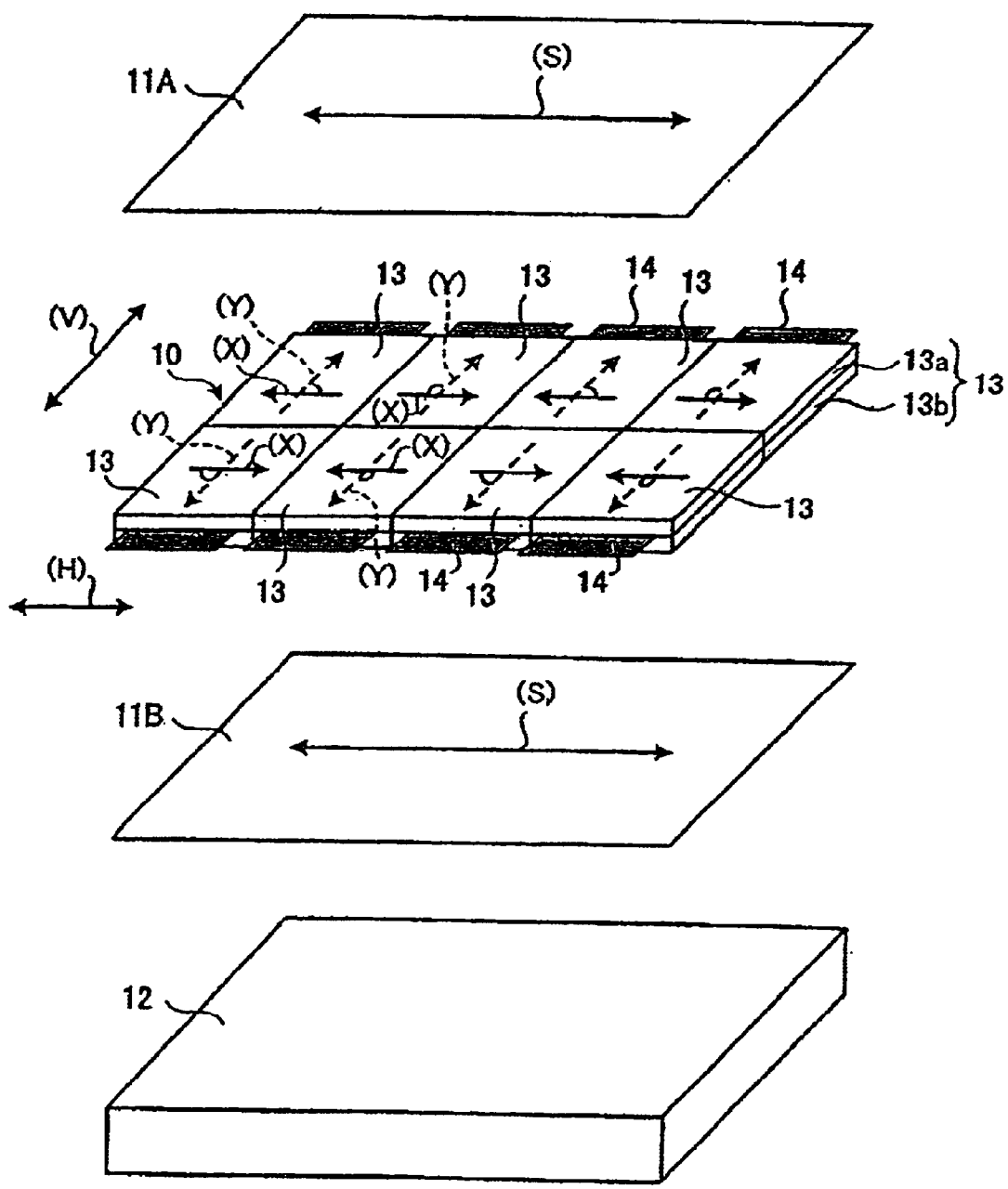
FIG. 1 is a constitutional view schematically showing a liquid crystal display device of a normally black mode in an embodiment of the present invention.

FIG. 1 is a view for explaining a schematic structure of a liquid crystal display device in this embodiment. As shown in FIG. 1, the liquid crystal display device (display device) includes: a liquid crystal panel unit (display panel, display panel unit) 10 for displaying an image; a polarizing plate 11A provided above an emitting surface of the liquid crystal panel unit 10; a polarizing plate 11B provided below an incident surface of the liquid crystal panel unit 10; and a backlight unit (light source) 12 as a light source for emitting planar light toward the liquid crystal panel 10.

The liquid crystal panel unit 10 is constituted of a plurality of tile panels (modular display panels) 13, which are eight in this embodiment, by multiplying two panels placed vertically (in a short axis direction: shown by an arrow (V) in the drawing) by four panels placed horizontally (in a long axis direction: shown by an arrow (H) in the drawing). Each tile panel 13 has a rectangular shape when viewed from above. And, each tile panel 13 is constituted in such a manner that, between a pair of substrates 13a and 13b made of a glass series material, unillustrated data lines and scan lines are provided in a matrix fashion, and the liquid crystal driven by voltages applied to the data lines and the scan lines is filled.

And, the tile panel 13 is provided with a drive circuit portion (drive circuit) 14 for the data lines and the scan lines only on one side thereof. In the liquid crystal panel unit 10, these tile panels 13 are arranged in a state where the drive circuit portions 14 are protruded to the both sides in a vertical direction of the liquid crystal panel unit 10. In addition, the tile panels 13 adjacent to each other in the vertical direction or in the horizontal direction are integrated by joining means such as adhesive in a state where the same side ends are confronted with each other. Here in FIG. 1, arrows (X) shown by the solid lines indicate rubbing directions (aligning treatment directions) for the substrates 13a, and arrows (Y) shown by the dotted lines indicate rubbing directions for the substrates 13b.

Figure 2:
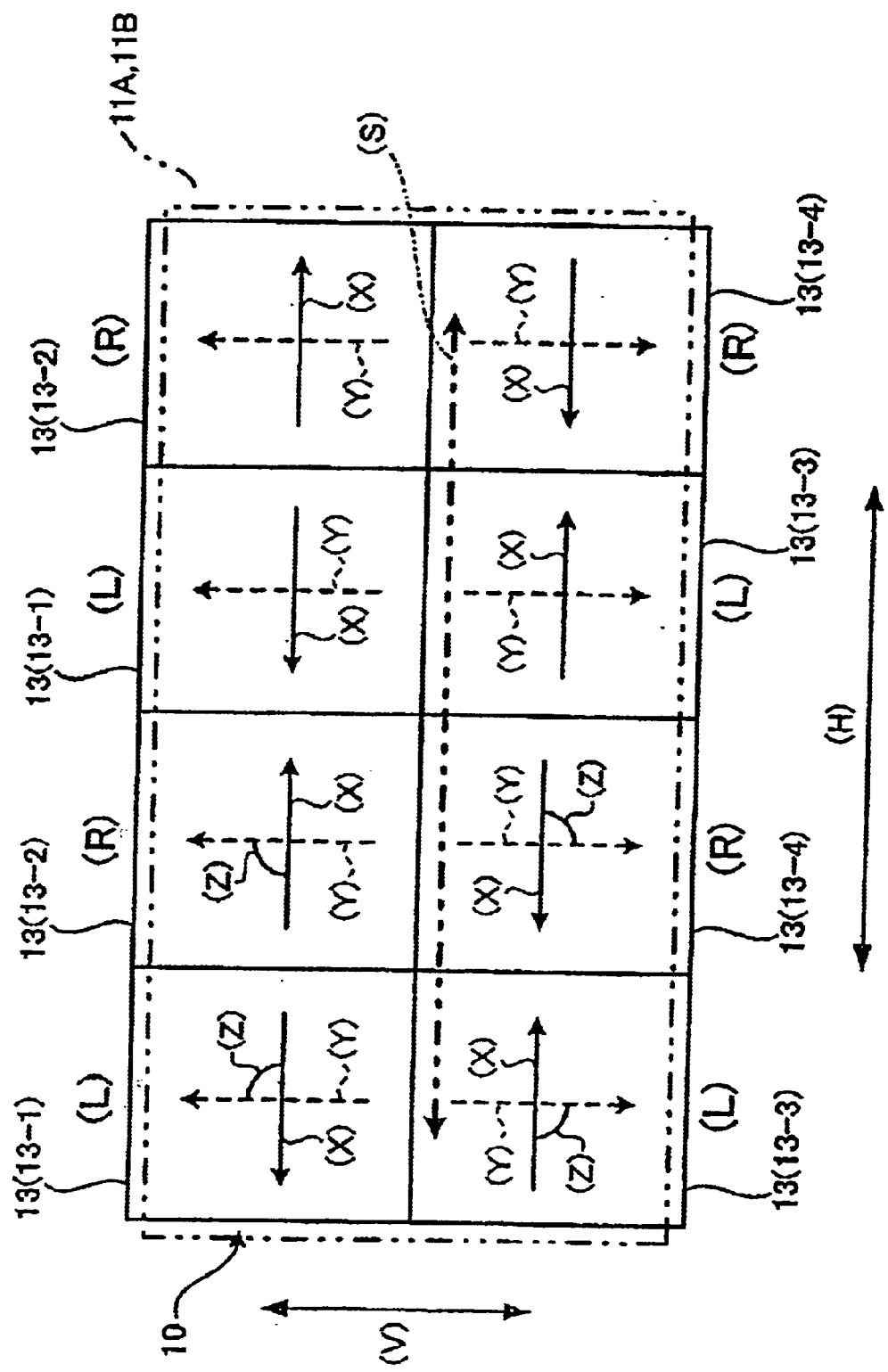
FIG. 2 is a plane view showing a constitution of a liquid crystal panel unit.

Moreover, in these tile panels 13, inner surfaces of the substrates 13a and 13b are rubbed for aligning the liquid crystal (optical element for display) filled in the inside of the tile panels 13. In each pair of the substrates 13a and 13b, the rubbing directions therefor are perpendicular to each other as shown by the arrows (X) and (Y) in FIG. 1. Moreover, as shown in FIG. 2, the rubbing direction shown by the arrow (X) of each tile panel 13 is coincident with a horizontal direction (H) of the liquid crystal panel unit 10, and the rubbing direction shown by the arrow (Y) of each tile panel 13 is coincident with a vertical direction (V) of the liquid crystal panel 10.

Note that, though the rubbing is exemplified as aligning treatment for aligning the liquid crystal in this embodiment, it will be apparent to those skilled in the art that other types of aligning treatment can be applied. As other types of applicable aligning treatment, irradiation of rays such as ultraviolet rays, ion beam irradiation, oblique deposition and the like are mentioned.

Furthermore, in the liquid crystal panel unit 10, for each set of four tile panels 13, the rubbing directions therefor are made to differ from one another. Specifically, in two tile panels 13-1 and 13-2 adjacent to each other and two tile panels 13-3 and 13-4 adjacent to each other in the horizontal direction (H) of the liquid crystal panel unit 10, the rubbing directions (X) for the substrates 13a are set opposite to each other. And, in two tile panels 13-1 and 13-3 adjacent to each other and two tile panels 13-2 and 13-4 adjacent to each other in the vertical direction (V) of the liquid crystal panel unit 10, the rubbing directions (Y) for the substrates 13b are set opposite to each other.

Here, in each tile panel 13, a turning direction of the alignment of liquid crystal molecules filled between the pair of substrates 13a and 13b, that is, a twisting direction of an alignment where long axes of the molecules continuously twist by 90 degrees from the substrate 13a to the substrate 13b, principally depends on the rubbing directions (X) and (Y) for the substrates 13a and 13b. Moreover, in order to prevent a reverse twist phenomenon that the liquid crystal molecules are reversed by 180 degrees, a chiral agent for regulating the turning direction of the liquid crystal molecules is added thereto.

In each of the tile panels 13 where the turning directions of the liquid crystal molecules are defined as described above, tile panels 13 shown by reference codes (R) where the turning directions of the liquid crystal molecules are right-handed and tile panels 13 shown by reference codes (L) where the turning directions of the liquid crystal molecules are left-handed are arranged alternately in the direction of the long axis of the liquid crystal panel 10.

And, in each of the tile panels 13 as described above, a viewing direction of high contrast depends on a direction from which the liquid crystal molecules are erected, which is a direction shown by a reference code (Z) in FIG. 2. Accordingly, in the set of four tile panels 13, the viewing directions (Z) of high contrast are set in four directions oblique to the vertical (V) and horizontal (H) directions of the liquid crystal panel unit 10.

Meanwhile, the polarizing plates 11A and 11B are prepared in such a manner that a material, for example, obtained by mixing iodine to a polyvinyl alcohol type base material is used, and extended in a certain direction during manufacturing, and thus molecules of the material and the iodine are oriented in that certain direction. And, the extended direction becomes a direction of absorption axes (S) of the polarizing plates 11A and 11B. The liquid crystal display device shown in FIG. 1 is of a normally black mode, where the directions of the absorption axes (S) of the polarizing plates 11A and 11B disposed above and below the liquid crystal panel 10 are parallel to each other. And, the polarizing plates 11A and 11B are set so that the absorption axes (S) thereof are made coincident with the horizontal direction (H) of the liquid crystal panel unit 10.

Figure 3:
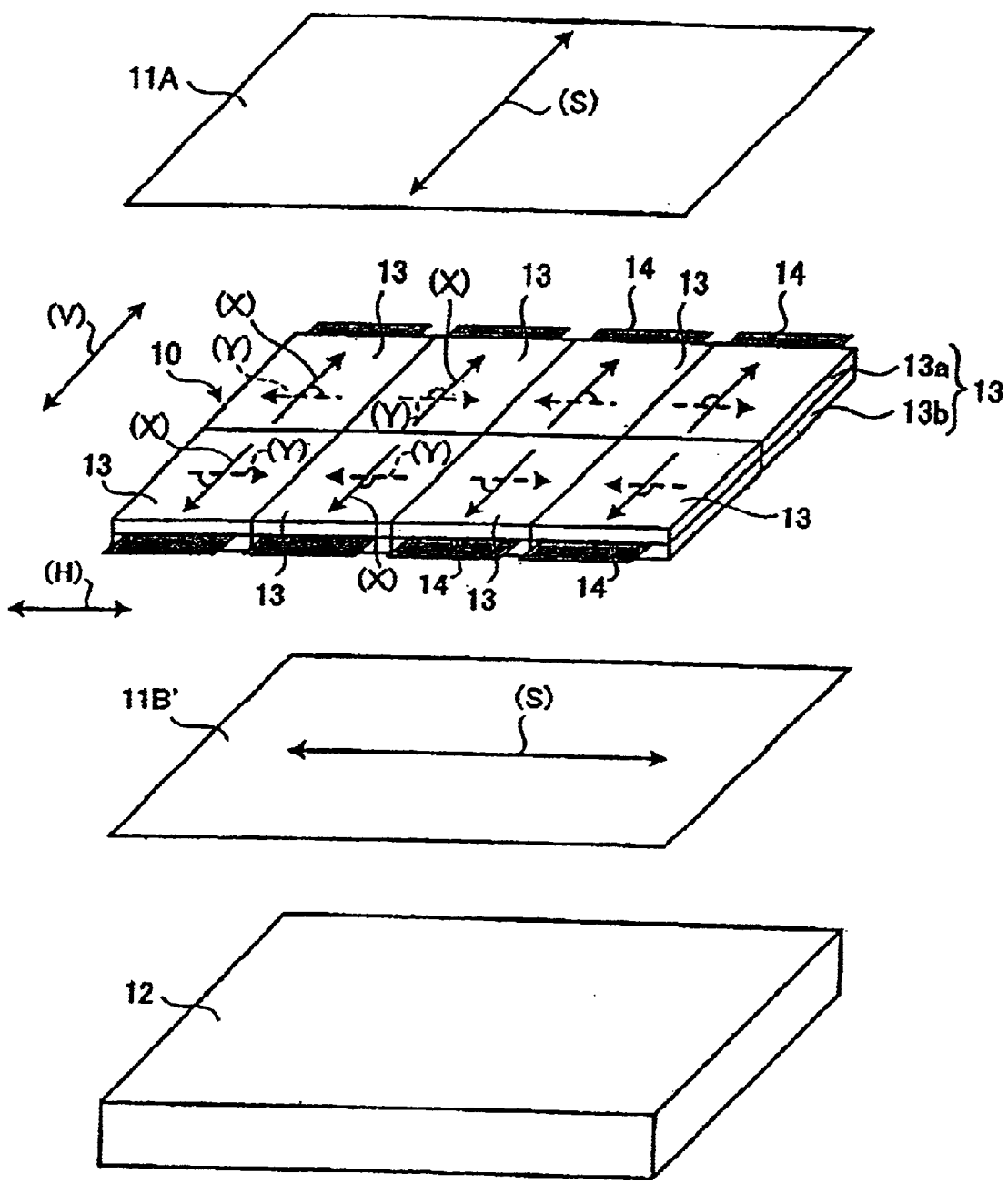
FIG. 3 is a constitutional view schematically showing a liquid crystal display device of a normally white mode in the embodiment.

FIG. 3 shows a liquid crystal display device of a normally white mode, where directions of absorption axes (S) of polarizing plates 11A and 11B' disposed above and below the liquid crystal panel unit 10 are perpendicular to each other. And, the polarizing plates 11A and 11B' are set in such a way that the absorption axis (S) of one polarizing plate 11A is made coincident with the vertical direction (V) of the liquid crystal panel unit 10 and that the absorption axis (S) of the other polarizing plate 11B' is made coincident with the horizontal direction (H) thereof.

Figure 4:
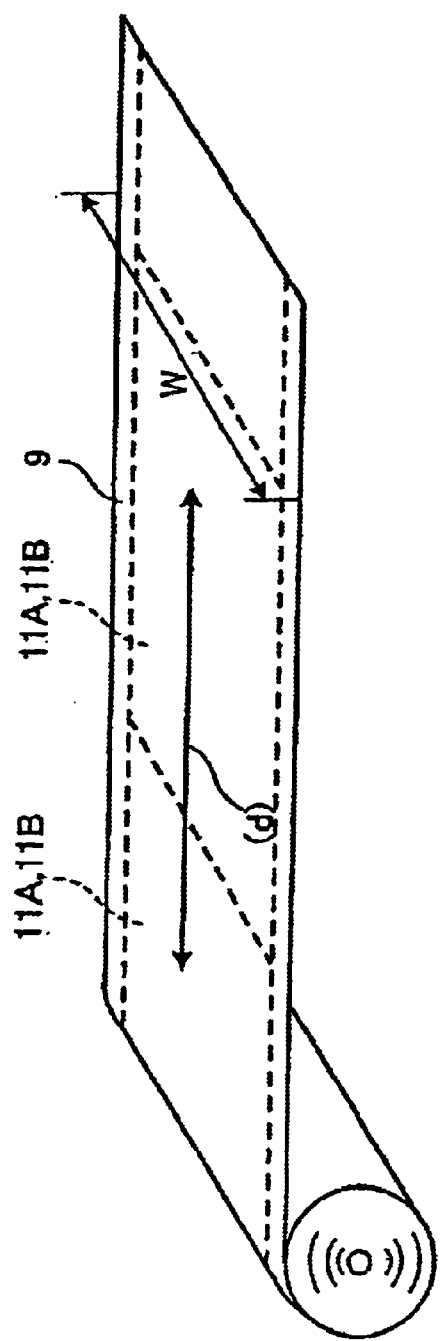
FIG. 4 is a view showing a layout when polarizing plates are cut out of a material during formation thereof.

With a constitution as described above, the rubbing directions (X) of the tile panels 13 constituting the liquid crystal panel unit 10 are set so as to be coincident with the vertical direction (V) of the liquid crystal panel unit 10, and the rubbing directions (Y) of the tile panels 13 are set so as to be coincident with the horizontal direction (H) of the liquid crystal panel unit 10. And in the liquid crystal display device of the normally black mode, the directions of the both absorption axes (S) of the polarizing plates 11A and 11B are set so as to be coincident with the horizontal direction (H) of the liquid crystal panel unit 10. Also in the liquid crystal display device of the normally white mode, the direction of the absorption axis (S) of the polarizing plate 11A is set so as to be coincident with the vertical direction (V) of the liquid crystal panel unit 10. Thus, as shown in FIG. 4, it is possible to cut the polarizing plates 11A and 11B long in the horizontal direction corresponding to the shape of the liquid crystal panel unit 10, out of a material 9 along the extending direction (d) thereof. Accordingly, as compared with the prior art, it is possible to form larger-sized polarizing plates 11A and 11B out of the material 9 with the same width W. Thus, it is possible to enlarge the liquid crystal display device, particularly in the vertical direction (V). Moreover, particularly in the case of the liquid crystal display device of the normally black mode, since the directions of the both optical absorption axes (S) of the polarizing plates 11A and 11B are coincident with the horizontal direction (H) of the liquid crystal display device, it is possible to constitute a horizontally long liquid crystal display device. Furthermore, since the yield of the material 9 is improved compared to the conventional one, it is also possible to reduce material costs.

Also, in the liquid crystal panel unit 10, with regard to the set of four tile panels 13, the rubbing directions are made to differ from one another, thus the viewing directions (Z) of high contrast are distributed into four directions. Therefore, equalization of the viewing angles can be achieved.

Furthermore, the turning directions (R) and (L) of the liquid crystal molecules in each of the tile panels 13 are arranged alternately in the horizontal direction (H) of the liquid crystal panel unit 10. Thus, in this viewpoint as well, the equalization of the viewing angles can be further achieved.

Note that the foregoing embodiment does not at all limit the number, an aspect ratio and the like of the tile panels 13 constituting the liquid crystal panel unit 10. Moreover, any material may be used for the tile panels 13 and the polarizing plates 11A and 11B.

Moreover, in the liquid crystal panel unit 10, with regard to the set of four tile panels 13, the rubbing directions (X) and (Y) and the turning directions of the liquid crystal molecules are made to differ from one another, and thus constituted that the viewing directions (Z) of high contrast are varied each other. However, it is not intended to limit the alignment of the tile panels as described above. The alignment may be changed properly in accordance with, for example, the number and the size of the arranged tile panels 13, the size of the liquid crystal panel unit 10 or the like.

Furthermore, in the foregoing embodiment, the tile panels 13 provided with the drive circuit portion 14 only on one side respectively thereof are used. However, if the liquid crystal panel unit 10 is constituted of up to four tile panels 13 by 2 vertical panels by 2 horizontal panels, the tile panels 13 provided with the drive circuit portions on two sides respectively thereof may be used.

Furthermore, as to the backlight unit 12, its structure, sorts of the light source and the like are therefore not limited at all, as long as the backlight unit 12 can irradiate an even planar light onto the liquid crystal panel unit 10.

Figure 5:
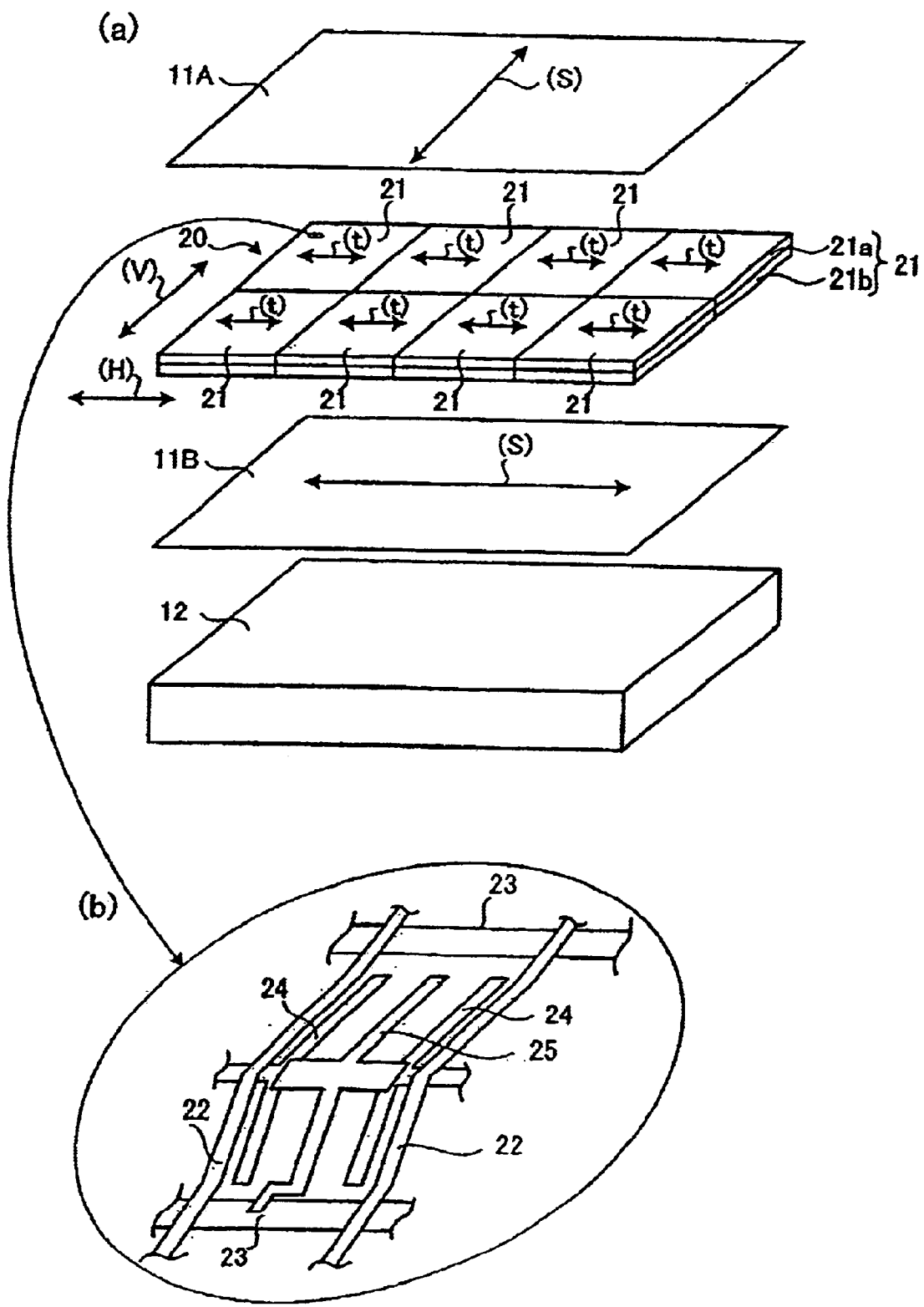
FIG. 5A is a constitutional view schematically showing a liquid crystal display device using tile panels of an IPS mode.
FIG. 5B is an enlarged view of a part of FIG. 5A.
Figure 6:
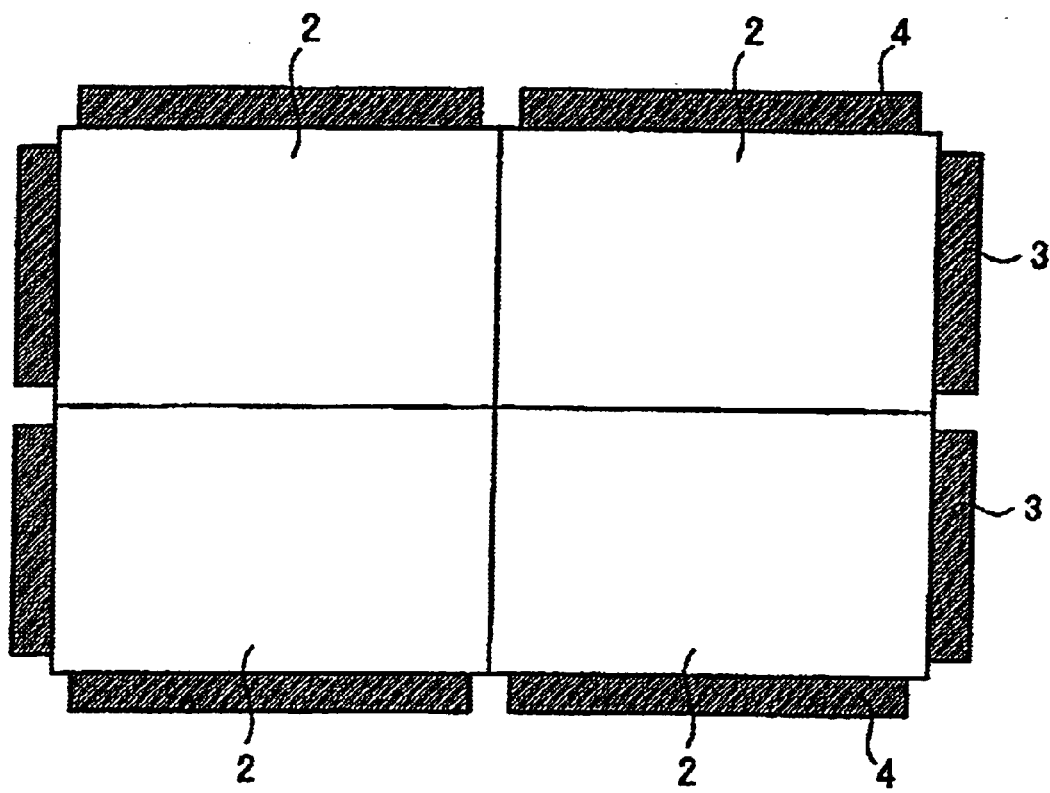
FIG. 6 is a view showing an example of a conventional liquid crystal display device.
Figure 7:
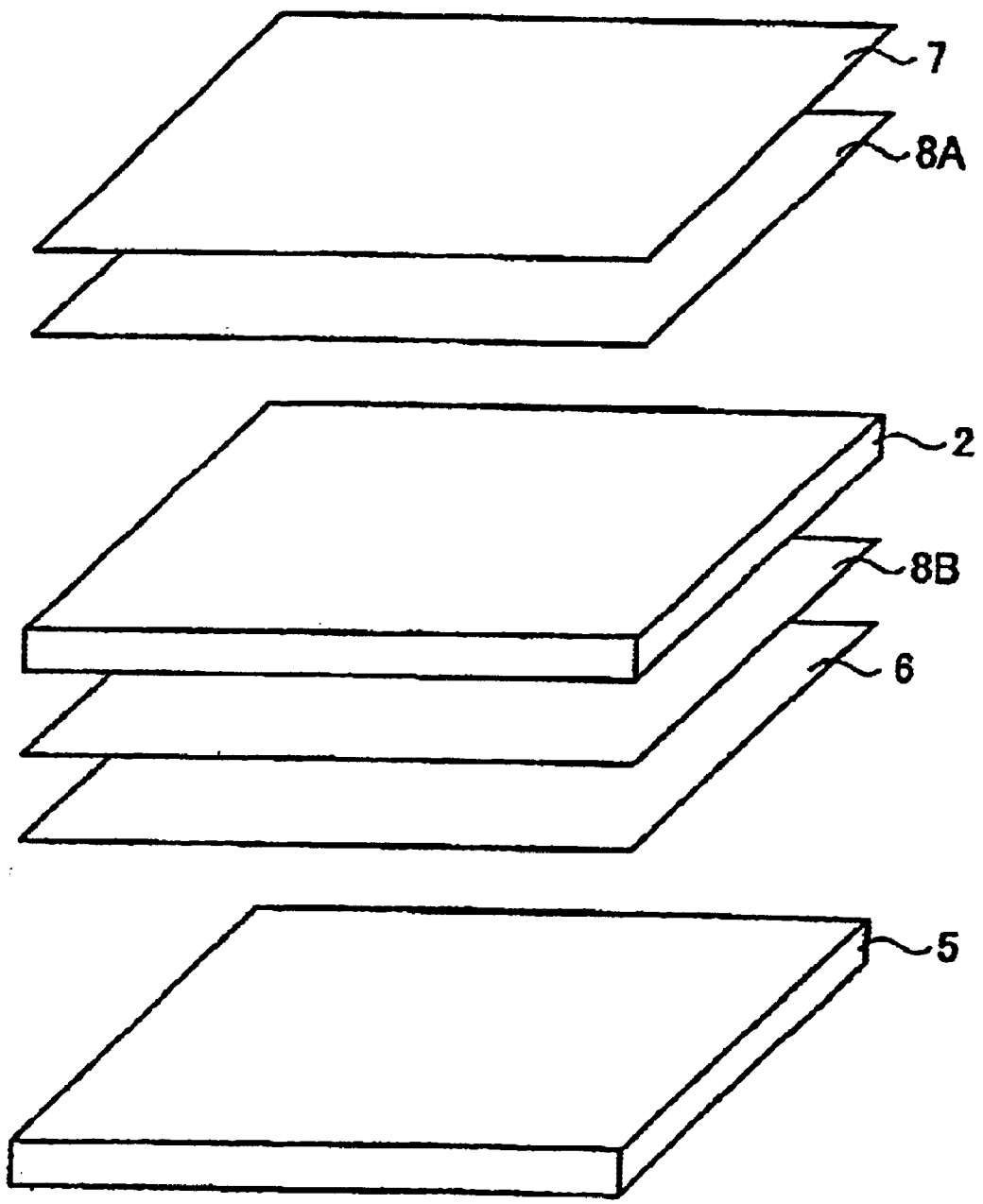
FIG. 7 is a view showing an example provided with a light collection member and a diffusion member.
Figure 8:
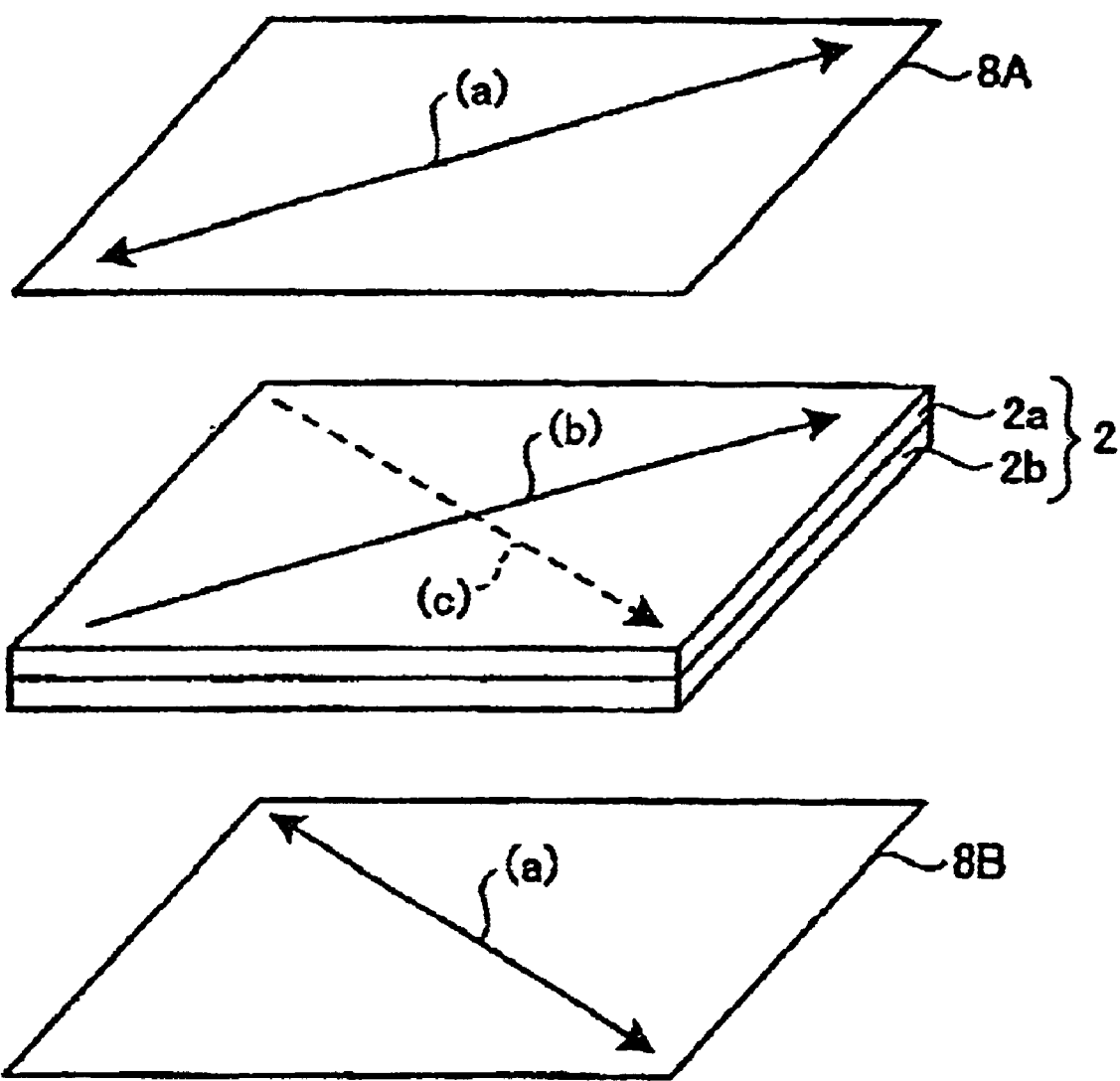
FIG. 8 is a view showing relations between rubbing directions of a liquid crystal panel and absorption axis directions of polarizing plates.
Figure 9:
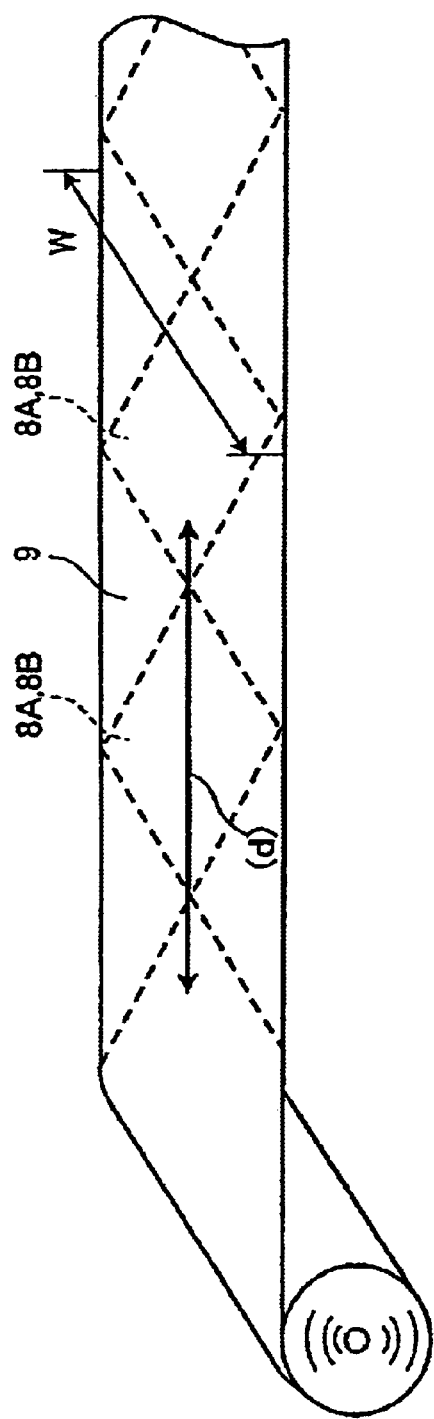
FIG. 9 is a view showing a layout when the polarizing plates are cut out of a material during conventional formation thereof.

Moreover, in the foregoing embodiment, as the liquid crystal panel unit 10, a liquid crystal panel unit in the TN mode is exemplified. However, the same constitution as described above can be also applied to a liquid crystal panel unit in the IPS mode. FIGS. 5A and 5B show a constitution of a liquid crystal display device when tile panels (modular display panels) 21 of the IPS mode are used for a liquid crystal panel unit 20. With regard to the liquid crystal display device shown in FIGS. 5A and 5B, the constitutions except for the liquid crystal panel unit 20, that is, the constitutions of the polarizing plates 11A and 11B disposed above and below the liquid crystal panel unit 20, the backlight unit 12 as a light source irradiating a planar light onto the liquid crystal panel unit 20 and the like are the same as the constitutions shown in FIG. 1 of the foregoing embodiment.

The liquid crystal panel unit 20 is constituted in such a manner that, for example, eight pieces of the tile panels 21 by 2 vertical panels by 4 horizontal panels are joined with one another.

As shown in FIG. 5B, each tile panel 21 has a constitution that liquid crystal is filled between a pair of substrates 21a and 21b, and that signal lines 22, gate lines 23, common electrodes 24, pixel electrodes 25 and the like are disposed therein. In each pixel area defined by the signal lines 22 and the gate lines 23 arranged in a matrix fashion, a voltage is applied between two common electrodes 24 disposed respectively along the signal lines 22 and the pixel electrode 25 disposed at an intermediate position of the two common electrodes 24, and a transverse electric field in a direction along the surfaces of the substrates 21a and 21b is generated to drive the liquid crystal, thus performing a desired display.

As shown in FIG. 5A, in the tile panel 21 of the IPS mode as described above, the direction of rubbing performed on the substrates 21a and 21b coincides with a direction where the signal lines 22 are arranged. And, in the liquid crystal panel unit 20, each tile panel 21 is provided so that the rubbing direction thereof shown by a reference code (t) in FIG. 5A is made parallel to the horizontal direction (H) of the liquid crystal panel unit 20. Note that, here in FIG. 5A, the rubbing direction shown by the code (t) for each of the substrates 21a and 21b can be either leftward or rightward. Specifically, combinations of the rubbing directions for the substrates 21a and 21b can be four ways: leftward and leftward; rightward and rightward; leftward and rightward; and rightward and leftward, respectively.

And in the case of the normally black mode, with regard to the polarizing plates 11A and 11B disposed above and below the liquid crystal panel unit 20, the absorption axes (S) thereof are set so as to be perpendicular to each other, and the direction of the absorption axis (S) of the polarizing plate 11B is set so as to be coincident with the horizontal direction (H) of the liquid crystal panel unit 20.

Also when the tile panels 21 of the IPS mode constituted as described above are used, similarly to the foregoing embodiment, larger-sized polarizing plates 11A and 11B can be formed out of the material 9 with the same width W. Accordingly, the enlargement of the liquid crystal display device can be achieved. Moreover, since the yield of the material 9 is improved, it is also possible to reduce the material costs.

Furthermore, in the foregoing embodiment, as aligning treatment for aligning the optical elements for display such as liquid crystal, the rubbing is exemplified. However, other types of aligning treatment such as irradiation of rays such as ultraviolet rays, ion beam irradiation, oblique deposition can be applied.

As described above, according to the present invention, enlargement of the display device can be achieved, and the material costs of the polarizing plates can be reduced. Moreover, according to the present invention, when the tile panels of the TN mode are used, the viewing angle characteristics can be improved by distributing the viewing directions of high contrast of the panels.

Although the preferred embodiment of the present invention has been described in detail, it should be understood that various changes, substitutions and alternations can be made therein without departing from spirit and scope of the inventions as defined by the appended claims.

What is claimed is:

1. A display panel device comprising:
   a display panel having two opposed surfaces and having optical elements for display disposed between two substrates; and
   two polarizing plates disposed on both surfaces of said display panel, each of said two polarizing plates having a predetermined direction of an optical absorption axis;
   wherein said two substrates are subjected to an aligning treatment for aligning in predetermined directions said optical elements for display, and each of said predetermined directions of the aligning treatment is independently coincident with a vertical direction or a horizontal direction of said display panel device; and
   wherein each of said predetermined directions of optical absorption axes of said two polarizing plates are independently coincident with one of the vertical direction and the horizontal direction of said display panel device.

2. The display panel device according to claim 1, wherein said predetermined directions of said optical absorption axes of said polarizing plates coincide with a direction of a longer axis selected out of the vertical direction and the horizontal direction of said display panel device.

3. The display panel device according to claim 1, further comprising:
   a plurality of said display panels arranged on one plane; and
   each of said polarizing plates is disposed, respectively, on each of both surfaces of said plurality of display panels.

4. The display panel device according to claim 3, wherein each of said plurality of display panels having an aligning treatment for aligning in a predetermined direction said optical elements for display; and
   wherein said predetermined directions of said aligning treatment for said display panels adjacent to each other in said plurality of display panels are made to differ from each other.

5. The display panel device according to claim 1, wherein said display panel device is of a normally black mode of a 90 degrees twisted nematic type; and
   the predetermined directions of said optical absorption axes of said polarizing plates disposed on the both surfaces of said display panel coincide with the direction of the long axis of said display panel device.

6. The display panel device according to claim 1, wherein said display panel device is of a normally white mode of a parallel alignment type; and
   the predetermined directions of said optical absorption axes of said polarizing plates disposed on the both surfaces of said display panel coincide with the direction of the long axis of said display panel device.

7. A display panel unit comprising:
   a plurality of modular display panels arranged on one plane and forming two opposed surfaces of the display panel unit, each modular display panel having liquid crystal filled between two substrates, and adjacent modular display panels are integrally joined; and wherein said plurality of modular display panels are laid out in order that viewing directions showing high contrast in said modular display panels are directed to a plurality of directions on the whole of said display panel unit, and wherein said two substrates of each modular display panel are subjected to an aligning treatment for aligning said liquid crystal in a predetermined direction wherein said predetermined direction is parallel to one of a long axis and a short axis of said display panel unit.

8. The display panel unit according to claim 7, further comprising:

polarizing plates covering said plurality of modular display panels on each of both surfaces of said display panel unit, said polarizing plates having predetermined optical absorption axes wherein said predetermined optical absorption axes of said polarizing plates are set parallel to one of the long axis and the short axis of said display panel unit.

9. The display panel unit according to claim 7, wherein, for each set of four of said modular display panels, said viewing directions showing high contrast are directed to four directions different from one another.

10. The display panel unit according to claim 7, wherein said modular display panels are arranged along a direction of the long axis of said display panel unit in order that twisting directions of liquid crystal molecule alignments in said modular display panels are alternated.

11. A display panel device, comprising:

a display panel unit including a plurality of modular display panels arranged on one plane and forming two opposed surfaces of the display panel unit, each modular display panel having two substrates filled with liquid crystal therebetween; and polarizing plates having predetermined optical absorption axes which coincide with one of a long axis and a short axis of said display panel unit, said polarizing plates being disposed respectively on both surfaces of said display panel unit;

wherein said substrates of each of said modular display panels are subjected to an aligning treatment for aligning said liquid crystal in predetermined directions based on the predetermined optical absorption axes of said polarizing plates.

12. The display panel device according to claim 11, wherein each of said modular display panels comprises:

pixel electrodes for applying a driving voltage to said liquid crystal; and common electrodes for generating an electric field between said pixel electrodes and said common electrodes in a direction along surfaces of said substrates.

13. A display panel device comprising:

a plurality of modular display panels arranged on one plane, each having two substrates filled with liquid crystal therebetween, and adjacent modular display panels are integrally joined; and wherein said modular display panels are laid out in order that a viewing direction showing high contrast in each of said modular display panels is directed to a direction different from one another for each set composed of n pieces of said modular display panels adjacent to each other where n being equal or more than 2.

14. The display panel device according to claim 13, wherein said modular display panels are laid out in order that predetermined directions of an aligning treatment performed on said substrates for aligning said liquid crystal are parallel to one of a long axis and a short axis of said display panel device.

15. A display device, comprising:

a display panel including a plurality of modular display panels arranged on one plane and forming two opposed surfaces of the display panel, each modular display panel having optical elements for display disposed between two substrates, and polarizing plates disposed along both surfaces of said modular display panels;

drive circuits for driving each of said modular display panels; and a light source for irradiating a planar light onto said display panel;

wherein said substrates have predetermined directions of an aligning treatment performed on said substrates for aligning said optical elements for display and said polarizing plates have predetermined directions of optical absorption axes, and wherein said predetermined directions of the aligning treatment and said predetermined directions of the optical absorption axes are coincident with one or both directions of a long axis and a short axis of said display panel.

16. The display device according to claim 15, wherein, in a pair of modular display panels adjacent in the direction of the long axis and the short axis, a combination of a direction of aligning treatment on one substrate and a direction of aligning treatment on the other substrate in one modular display panel and the combination of a direction of aligning treatment on one substrate and a direction of aligning treatment on the other substrate in the other modular display panel are made different from each other.

* * * * *